United States Patent [19]

Wright

[11] 4,151,095
[45] Apr. 24, 1979

[54] PLEATED FLUID FILTER

[75] Inventor: Mervin E. Wright, Apple Valley, Minn.

[73] Assignee: Donaldson Company, Inc., Minneapolis, Minn.

[21] Appl. No.: 918,939

[22] Filed: Jun. 26, 1978

[51] Int. Cl.² .................. B01D 27/06; B01D 46/02; B01D 46/52; B29D 23/10
[52] U.S. Cl. ............................ 210/443; 55/497; 55/498; 55/502; 55/510; 55/511; 55/521; 55/529; 55/DIG. 5; 156/218; 156/227; 210/487; 210/493 R; 210/493 FR
[58] Field of Search .............. 55/497, 498, 500, 502, 55/510, 511, 521, 529, DIG. 5; 210/487, 443, 493 R, 493 FR; 156/218, 227, 278

[56] References Cited

U.S. PATENT DOCUMENTS

| 1,880,552 | 10/1932 | Ward | 55/521 X |
|---|---|---|---|
| 2,409,078 | 10/1946 | Swann | 55/501 X |
| 2,731,108 | 1/1956 | Kennedy | 55/521 |
| 3,279,616 | 10/1966 | Bourdale | 210/487 |
| 3,386,232 | 6/1968 | Gaines, Jr. | 55/521 X |
| 3,640,396 | 2/1972 | Brownell | 210/493 R |
| 3,681,898 | 8/1972 | Hopkins et al. | 55/487 |
| 3,686,837 | 8/1972 | Hopkins et al. | 55/487 |
| 3,859,068 | 1/1975 | McLaren et al. | 55/521 X |

FOREIGN PATENT DOCUMENTS

| 795282 | 3/1936 | France | 55/521 |
|---|---|---|---|
| 54053 | 5/1947 | France | 55/500 |
| 162161 | 2/1958 | Sweden | 55/529 |

Primary Examiner—Frank W. Lutter
Assistant Examiner—Kathleen J. Prunner
Attorney, Agent, or Firm—Merchant, Gould, Smith, Edell, Welter & Schmidt

[57] ABSTRACT

A sheet of porous filter material folded into accordion pleats, the pleats having opposite edges folded over on diagonal fold lines to close the opposite edges of alternate pleats. The pleated and folded sheet is selectively disposed in flat panel form or formed into a tube with the pleats extending axially of the tube. When the filter is in its tubular form, the folded pleat ends are disposed at the exterior of the tube.

12 Claims, 10 Drawing Figures

PLEATED FLUID FILTER

BACKGROUND OF THE INVENTION

This invention relates generally to filters and more particularly to fluid filters or cleaners using porous paper as a filtering medium. Paper filter elements are known, and provide filter structures that are relatively low in cost so as to be readily disposed of after the useful life thereof is ended. Paper filter elements are usually pleated for the purpose of providing a large filtering surface area in a relatively small space. Such structure requires that extensive sealing means be used at the ends of the pleats, or that the pleats be folded, pressed together, and retained by sealing rings molded or otherwise fabricated for this purpose. Such sealing means have been found to be relatively costly, particularly for disposable filter elements. Hence, an object of this invention is the provision of a filter of pleated filter paper that can be easily and inexpensively fabricated, and having pleat ends that are folded so as to be substantially self sealing.

Another object of this invention is the provision of a filter element having folded pleat ends as set forth which requires a minimum of sealing material at said ends to render the same leakproof against foreign material.

Another object of this invention is the provision of a filter, as set forth, that can be selectively mounted as a flat pleated panel, or as a pleated tube.

Still another object of this invention is the provision of a method for producing the filter of this invention.

SUMMARY OF THE INVENTION

The filter of this invention involves an elongated porous sheet of filter material folded on longitudinally spaced transverse fold lines and in alternate directions to provide a plurality of accordion pleats having opposite edges. Each pleat has a pair of sides and adjacent pleats are oppositely directed and have a common side. Alternate ones of said pleats have a pair of score lines adjacent to at least one of the edges thereof and on said pair of sides thereof. Said score lines of each pair thereof extend diagonally from the fold lines of their adjacent pleats at said one of the edges to the fold line of their respective pleat. Said alternate pleats are folded upon themselves along their respective diagonal score lines, whereby to close the space between the sides thereof at said one of the edges of each of said alternate pleats.

DETAILED DESCRIPTION OF THE PREFERRED EMBODIMENT

Figure 3:
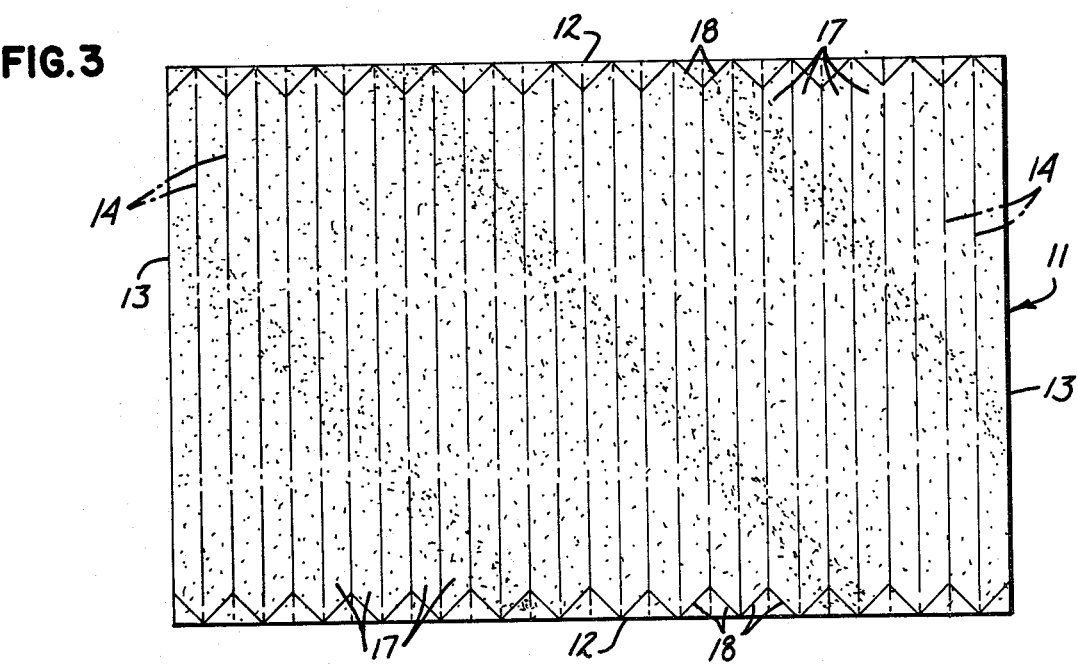
FIG. 3 is a view in plan of a sheet of filter material, in flat form, showing the pleat fold lines, and score lines for folding the ends of the pleats.
Figure 4:
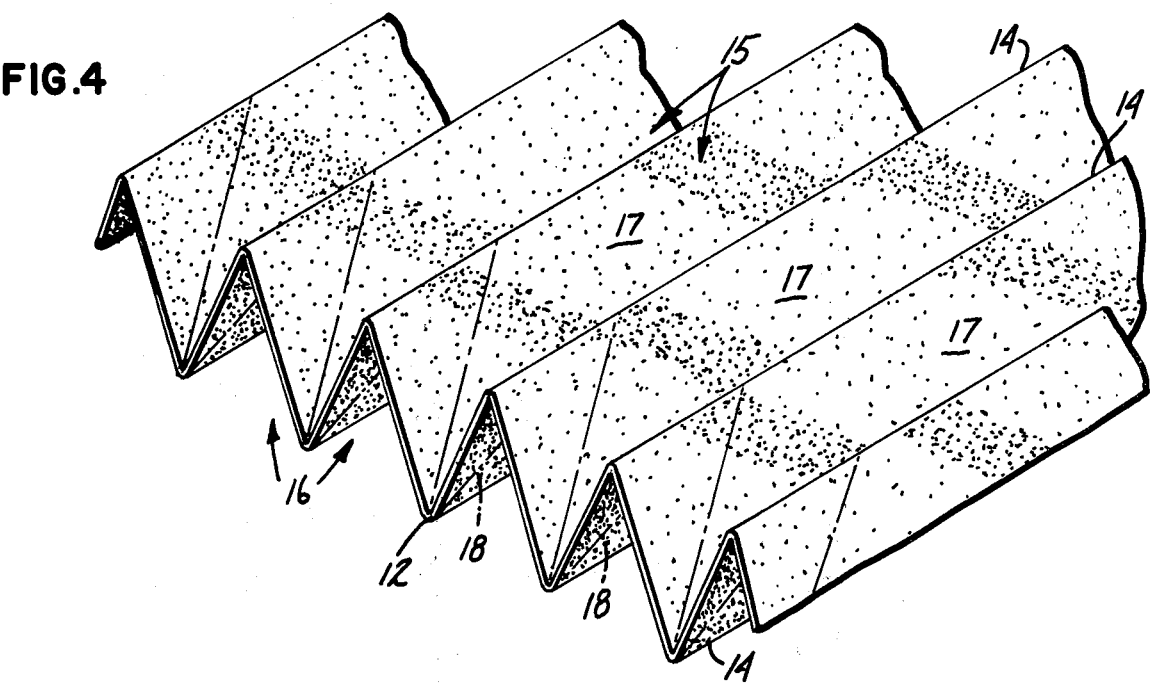
FIG. 4 is an enlarged fragmentary view in perspective of the sheet of FIG. 3 in accordion pleated form.

An elongated generally rectangular sheet of filter material, preferably of gas permeable paper, is shown in flat form in FIG. 3, and indicated generally at 11. The sheet 11 has opposite side edges 12 and opposite end edges 13, and is folded along longitudinally spaced transverse fold lines 14, and in alternate directions, to provide a plurality of alternate pleats 15 and 16, the pleats 15 opening in a direction opposite that of the pleats 16, see particularly FIGS. 4 and 5. Each pleat 15 and 16 has a pair of sides 17, each side 17 of each pleat 15 or 16 being common to adjacent pleats.

The side edges 12 of the sheet 11 form the extreme ends of the pleats 15 and 16, and alternate ones of said pleats are formed with score lines adjacent the opposite ends thereof on the pleat sides 17. The score lines are indicated at 18 and, for the purpose of the present example, it may be stated that each pleat 16 has the score lines 18 thereof extending diagonally from the fold lines of their adjacent pleats 15 at the edges thereof to the fold line 14 of each pleat 16.

Figure 1:
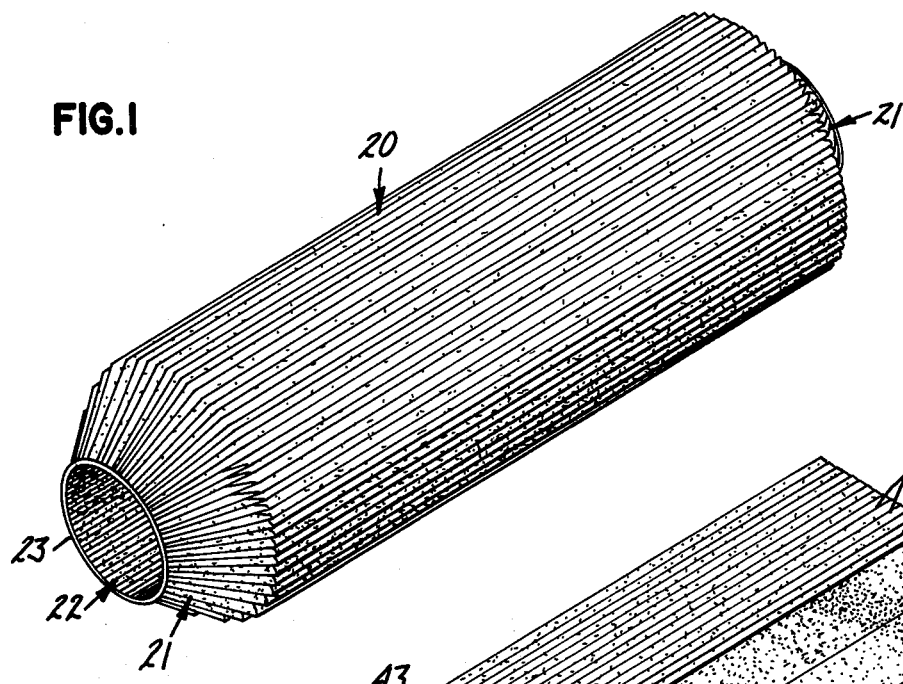
FIG. 1 is a view in perspective of the filter element of this invention bent into tubular form.
Figure 2:
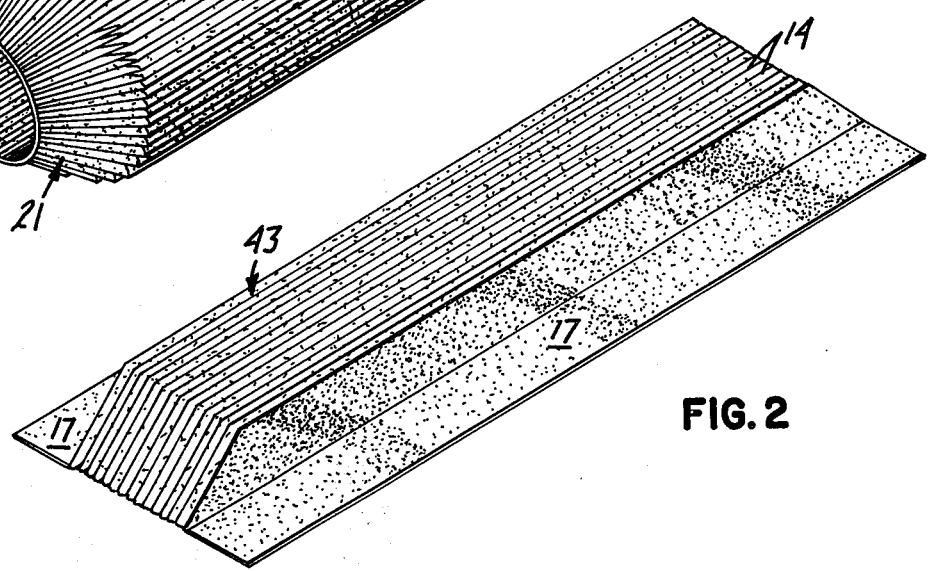
FIG. 2 is a view in perspective of the filter element in a flat panel arrangement.
Figure 5:
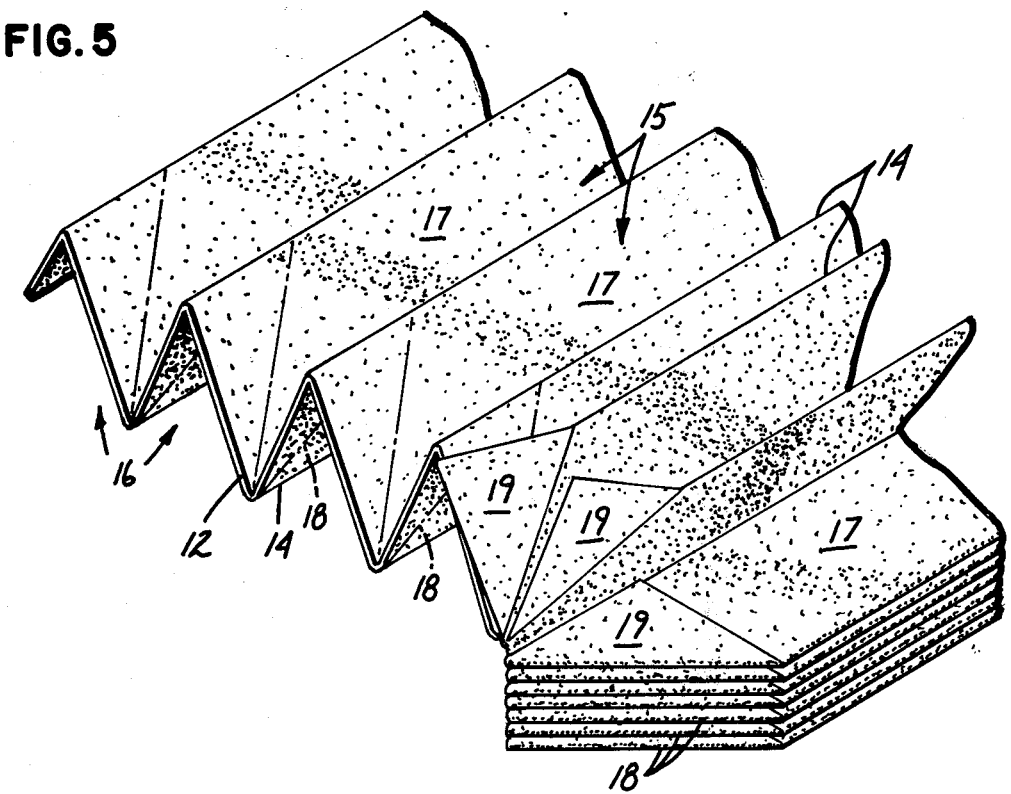
FIG. 5 is a fragmentary view in perspective of the pleated sheet, showing some of the pleats as having folded ends.

When the pleats 15 and 16 are formed in the sheet 11, the opposite ends of the pleats 16 are folded on the score lines 18, as shown in FIG. 5, the pleat sides 17 of each pleat 16 are folded over in a common direction on the score lines 18, with the folded over portion of one side 17 being lapped over the adjacent folded over portion of the adjacent side 17 of its respective pleat 16. As shown in FIG. 3, the score lines 18 are preferably disposed at an angle of 45° with respect to the adjacent side edges 12 and fold lines 14, so that the folded over portions of the sides 17 define generally right triangular shapes, as shown in FIG. 5, these folded over portions being indicated generally at 19. The folded over portions 19 act as spacers between the sides 17 of each alternating pleat 15, so as to admit air to the entire surfaces of the sides 17 between the folded over end portions 19 of the pleats 15 and 16. When all of the pleat ends are folded to provide the portions 19, the filter element thus formed may be used as a flat pleated element, as shown in FIG. 2, or the same may be bent to form a tube, as shown in FIG. 1. When thus formed, the opposite ends of the sheet 11 are secured together, those portions defining the score lines 18 cooperating to define frustoconical end portions of the tubular filter, the tubular filter being indicated generally at 20 in FIG. 1, the frustoconical end portions being indicated at 21. As shown, the portions 21 taper axially outwardly of their respective ends of the filter element 20, the portions defined by the score lines 18 converging axially outwardly with respect to the cylindrical filter element 20, toward a central opening 22 defined by the filter element 20. Although the folded over portions at the ends of each pleat 15 and 16 effectively seal the filter element against passage of foreign matter from one side to the other thereof, total sealing of the filter element is insured by the application of a thin bead 23 of suitable sealing material such as synthetic plastics, rubber or the like.

Figure 6:
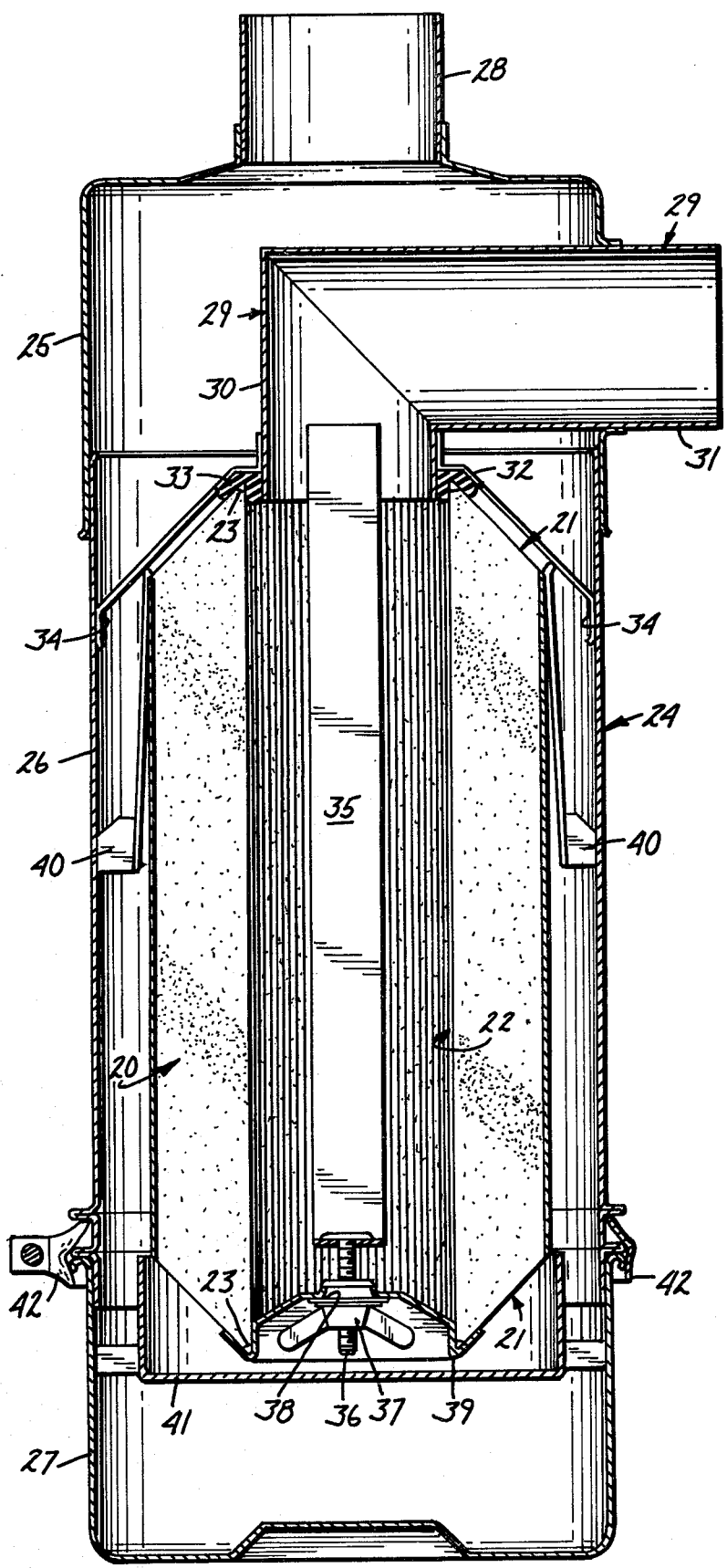
FIG. 6 is an axial section of an air cleaner housing, showing the filter element of FIG. 1 mounted therein.
Figure 7:
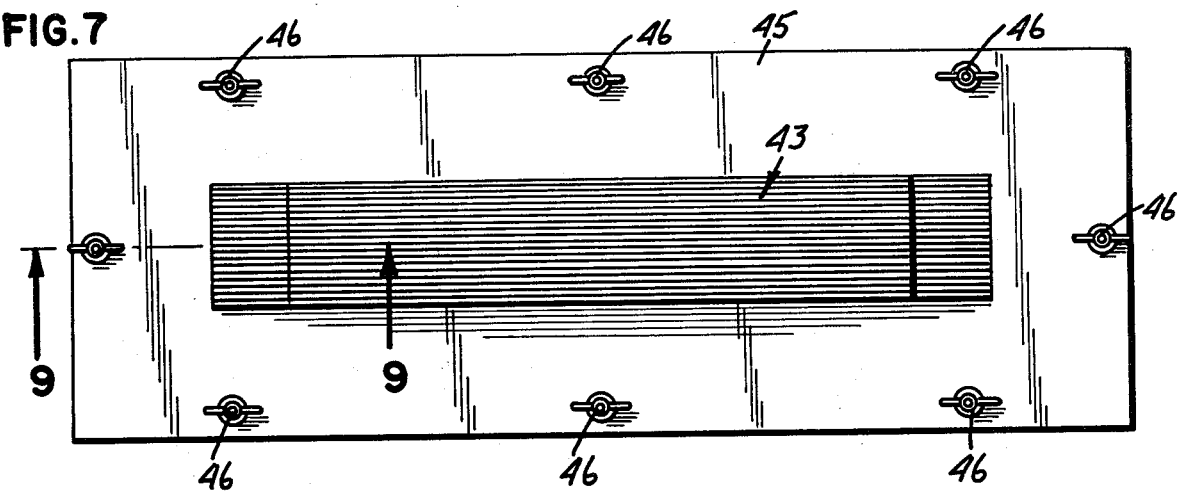
FIG. 7 is a view in top plan of a mounting frame with the filter element of FIG. 2 mounted therein.
Figure 8:
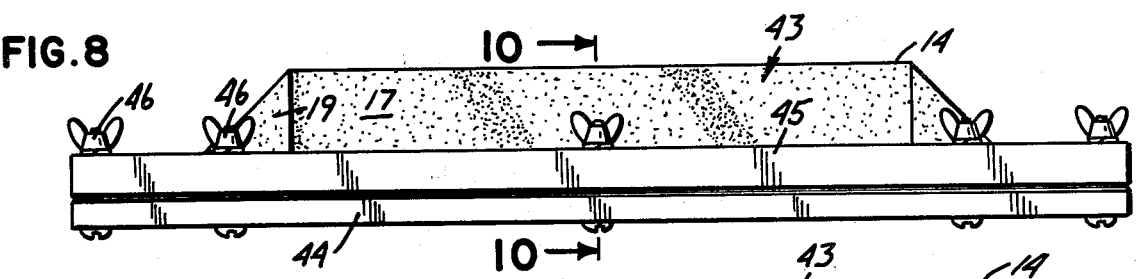
FIG. 8 is a view in side elevation of the filter of FIG. 7.

In FIG. 6, the filter element of FIG. 1 in tubular form is shown as being mounted in a support structure in the form of a generally cylindrical housing 24 defining a passageway therethrough and comprising a top section 25, an intermediate section 26, and a cup-like bottom section 27. The top section 25 is provided with an axially extending inlet fitting 28 and an outlet fitting 29 having an axially extending inlet end portion 30 and a radially extending outlet portion 31 that projects radially outwardly of one side of the top section 25. The inlet end 30 of the outlet fitting 29 has connected thereto an annular stop flange 32 for a cushioning washer or gasket 33 that engages one extreme end of the tubular filter element 20. The stop flange 32 has circumferentially spaced legs or portions 34 that slope outwardly and downwardly to engage the inner surface of the intermediate housing section 26.

A supporting leg or strip 35 has its upper end suitably anchored within the outlet fitting portion 30, and extends axially downwardly through the intermediate housing section 26, being fitted at its lower end with a downwardly projecting stud 36 that has screw threaded thereon a wing nut or like fastening 37. As shown, the supporting leg 35 extends axially through the tubular filter element 20, the wing nut 37 engaging a gasket 38 that is mounted in the center of a dished support member 39 that engages the extreme lower end of the filter element 20, and which cooperates with the gasketed stop flange 32 to secure the filter element 20 in position. The filter element 20 thus disposed divides the passageway defined by housing 24 into inlet and outlet portions which communicate with the inlet fitting 28 and the outlet fitting 29, respectively.

The intermediate housing section 26 has mounted therein circumferentially spaced vanes 40 for directing incoming air, and the bottom housing section 27 is provided with a cup-like baffle 41. The bottom section 27 collects the heavier articles of foreign matter, and is releasably secured to the lower end of the intermediate section 26 by a clamping band 42 of well-known conventional structure.

Figure 9:
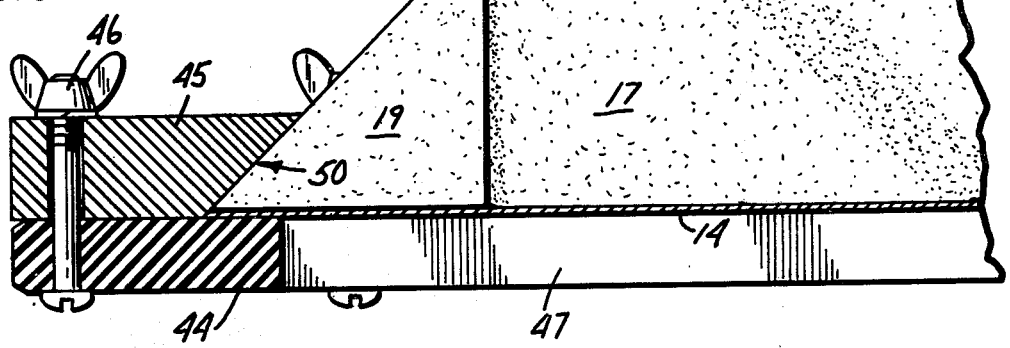
FIG. 9 is an enlarged fragmentary section taken on the line 9—9 of FIG. 7.
Figure 10:
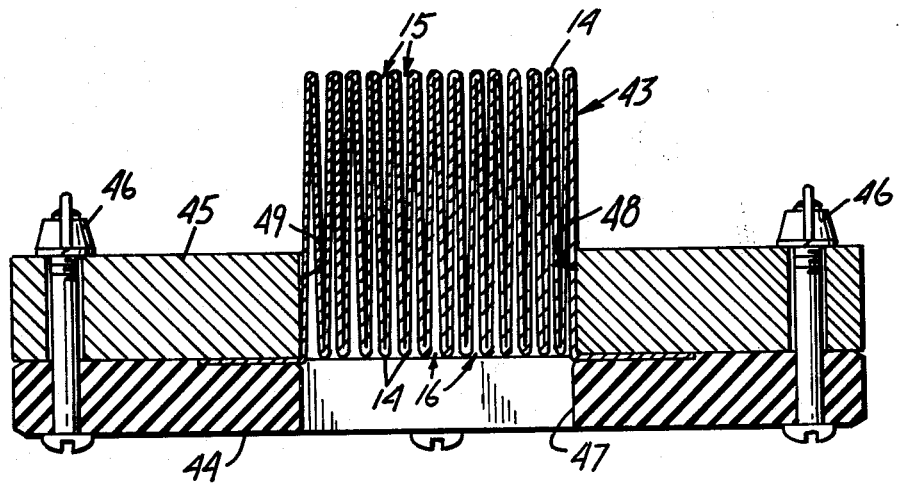
FIG. 10 is an enlarged transverse section taken on the line 10—10 of FIG. 8.

When the pleated and folded sheet 11 is left in flat form as shown in FIG. 2, it operates as a so-called panel filter element as indicated at 43 in FIGS. 2 and 7–10. In this arrangement, a pair of pleat sides 17 at the opposite ends of the sheet 11 are disposed in a common plane extending transversely of the element 43, to provide flanges for sealing and for mounting the element 43 in a flat frame. One form of flat mounting frame is shown in FIGS. 7–10, the same comprising rectangular gasket and retainer elements 44 and 45 respectively, these being shown as held together by wing nut equipped screws 46. The gasket 44 and retainer member 45 are formed to provide aligned rectangular openings 47 and 48 respectively, the retainer opening 48 having opposite side surfaces 49 that are normal to the planes of the top and bottom surfaces of the retainer member 45, and end surfaces 50 that are disposed at oblique angles to said planes. One of these end surfaces 50 is shown in FIG. 9. The end surfaces 50 correspond to the angles at the opposite ends of the pleats 15 and 16 when folded on the fold lines 18. As shown in FIGS. 9 and 10, when the flanges of the filter element 43 are mounted between the gasket 44 and retainer member 45, the sloping surfaces 50 effectively cover the extreme edges of the pleats, and the outstanding end pleat sides 17 are securely held between the gasket 44 and overlying retainer member 45. Thus, the filter element 43 is completely sealed against passage of foreign matter through the filter panel.

From the above, it will be appreciated that the filter element of this invention can be easily and inexpensively produced, requiring but a minimum of added sealing material at the opposite ends thereof, and which can be effectively used in tubular or flat panel form with equal facility.

While a preferred embodiment of filter element and a pair of filter arrangements thereof are herein disclosed, it will be understood that the same is capable of modification without departure from the spirit and scope of the invention, as defined in the claims.

What is claimed is:

1. A filter comprising an elongated porous sheet of filter material folded on longitudinally spaced transverse fold lines and in alternate directions to provide a plurality of accordion pleats having opposite edges, each pleat having a pair of sides and adjacent pleats being oppositely directed and having a common side, alternate ones of said pleats having a pair of score lines adjacent to at least one of the edges thereof and on said pair of sides thereof, each said pair of score lines extending diagonally from the fold lines of their adjacent pleats at said one of the edges to the fold line of their respective pleat, said alternate pleats being folded upon themselves along their respective diagonal score lines with one side of each alternate pleat being folded over the other side thereof whereby to close the space between the sides thereof at said one of the edges of each of said alternate pleats.

2. The filter defined in claim 1 in which said pleats are folded upon themselves in a single direction generally longitudinally of said sheet to provide uniform spaces between each pleat.

3. The filter defined in claim 2 in which the folded over portions of said pleats are generally right triangular in outline and having hypotenuse edges defined by the folds on said score lines, whereby said one edge of said pleats extends at an oblique angle from alternate ones of said fold lines to the other alternate ones of said fold lines.

4. The filter defined in claim 1 in which the opposite ends of said porous sheet are secured together to provide a tubular filter element in which alternating ones of said pleats open radially inwardly and outwardly respectively, the folded over portions of the pleats on said score lines cooperating to provide a frustoconical shape to at least one axial edge of said filter element.

5. The filter defined in claim 1 in which said alternate ones of said pleats have pairs of said score lines adjacent both edges thereof, the folds of the pleats on said score lines providing closed opposite side edges of said filter, said opposite side edges of the filter sloping in opposite directions from alternate ones of said fold lines to the other alternate ones thereof.

6. A filter comprising an elongated porous sheet of filter material folded on longitudinally spaced transverse fold lines and in alternate directions to provide a plurality of accordion pleats having opposite edges, each pleat having a pair of sides and adjacent pleats being oppositely directed and having a common side, alternate ones of said pleats having a pair of score lines adjacent both of the edges thereof and on said pair of sides thereof, each said pair of score lines extending diagonally from the fold lines of their adjacent pleats at their respective edges to the fold line of their respective pleat, said alternate pleats being folded upon themselves along their respective diagonal score lines with one side of each alternate pleat being folded over the other side thereof whereby to close the space between the sides thereof at said edges of each of said alternate pleats; a supporting structure defining a passageway therethrough; and means on said supporting structure engaging said pleats at the edges thereof for securing said pleats to said supporting structure.

7. The filter defined in claim 6 in which the opposite ends of said porous sheet are secured together to provide a tubular filter element in which alternating ones of said pleats open radially inwardly and outwardly respectively, the folded over portions of the pleats on said score lines cooperating to define a frustoconical shape to the opposite axial edges of said filter element, said supporting structure comprising a generally cylindrical housing having a fluid inlet and a fluid outlet, said filter element being disposed in said housing and dividing said passageway into inlet and outlet passageway portions communicating with said inlet and outlet respectively.

8. The filter defined in claim 6 in which said pleats are arranged in side-by-side relationship to dispose said filter as a generally flat pleated panel, said supporting structure comprising a generally flat gasket means having inner and outer surfaces and a rectangular opening extending therethrough from said inner surface to said outer surface, and a generally flat retainer member connected to said gasket means and having a rectangular opening through which said panel projects, one side of each of the outermost ones of said pleats being mounted and secured between the gasket means and the retainer member and the edges of said pleats having sealing engagement with said gasket means and retainer member.

9. The method of making a pleated filter element from an elongated sheet of filter material having opposite side edges and opposite ends, said method comprising: forming a plurality of longitudinally equally spaced parallel transverse pleat fold lines on said sheet of filter material and V-shaped score lines extending diagonally from alternate pleat fold lines at said opposite side edges of said sheet to the other alternating pleat fold lines but inwardly spaced from said side edges, folding said sheet on said pleat fold lines to provide a plurality of accordion pleats each having a pair of sides and adjacent pleats being oppositely directed and having a common side, and folding alternate ones of said pleats at their opposite side edges upon themselves on said diagonally extending score lines so that one side of each of said alternate pleats is folded over the other side thereof.

10. The method defined in claim 9, further including applying a sealant to the extreme opposite side edges of each of said alternate pleats adjacent the pleat score lines between the sides of said alternate pleats.

11. The method defined in claim 9, further including disposing the longitudinally opposite ends of said sheet between a pair of frame elements having openings therethrough, disposing the extreme opposite side edges of said pleats between said frame elements adjacent respective ends of said openings, and securing said frame elements together and into abutting engagement with said extreme opposite side edges of said pleats.

12. The method defined in claim 9 further including, bending the pleated and folded sheet into a cylinder in which said pleats extend axially of the cylinder and the opposite side edge portions defined by said score lines of said pleats converge in directions axially outwardly of said cylinder, and securing said opposite ends of said sheet together in overlapping relationship.

* * * * *